(12) United States Patent
Tamilmani (10) Patent No.: US 10,152,239 B1
(45) Date of Patent: Dec. 11, 2018

(54) MIGRATION TO A MULTI-TIERED DATA STORE

(71) Applicant: Amazon Technologies, Inc., Seattle, WA (US)

(72) Inventor: Karthik Tamilmani, Redmond, WA (US)

(73) Assignee: Amazon Technologies, Inc., Seattle, WA (US)

(*) Notice: Subject to any disclaimer, the term of this patent is extended or adjusted under 35 U.S.C. 154(b) by 163 days.

(21) Appl. No.: 15/051,560

(22) Filed: Feb. 23, 2016

(51) Int. Cl.
 *G06F 3/00* (2006.01)
 *G06F 3/06* (2006.01)
 *G06F 11/14* (2006.01)

(52) U.S. Cl.
 CPC .......... *G06F 3/0611* (2013.01); *G06F 3/065* (2013.01); *G06F 3/067* (2013.01); *G06F 3/0619* (2013.01); *G06F 3/0655* (2013.01); *G06F 11/1448* (2013.01)

(58) Field of Classification Search
 None
 See application file for complete search history.

(56) References Cited

U.S. PATENT DOCUMENTS

| | | |
|---|---|---|
| 7,437,609 B2 | 10/2008 | Anderson, Jr. et al. |
| 7,853,561 B2 | 12/2010 | Holenstein et al. |
| 8,121,978 B2 | 2/2012 | Wiss et al. |
| 8,639,660 B1 | 1/2014 | Ou |
| 8,874,508 B1 | 10/2014 | Mittal |
| 8,977,594 B2 | 3/2015 | Whitehead et al. |
| 9,423,962 B1* | 8/2016 | Basham .............. G06F 12/0868 |

\* cited by examiner

*Primary Examiner* — Midys Rojas
(74) *Attorney, Agent, or Firm* — Robert C. Kowert; Meyertons, Hood, Kivlin, Kowert & Goetzel, P.C.

(57) ABSTRACT

Methods, systems, and computer-readable media for migration to a two-tiered data store are disclosed. A destination data store comprises a primary (warm) tier and a secondary (cold) tier having higher latency for data access than the primary tier. Migration is initiated of live updates from a source data store to the primary tier of the destination data store. A replica of the source data store is generated while the source data store is online. Transform logic is optionally applied to source data from the replica of the source data store. The source data (transformed or not) is imported to the secondary tier of the destination data store.

20 Claims, 6 Drawing Sheets

MIGRATION TO A MULTI-TIERED DATA STORE

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to web servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers.

As the scale and scope of distributed systems have increased, the tasks of provisioning, administering, and managing the resources have become increasingly complicated. A distributed system referred to as a provider network may offer, to various customers, access to computing resources and services implemented using the distributed system. When customers access such resources remotely, the resources may be said to reside "in the cloud" and may represent cloud computing resources. For example, using such resources, the provider network may store data on behalf of customers in various types of storage solutions. The provider network may offer various types of services for managing the cloud computing resources, including storage-related services for managing stored data.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for migration to a multi-tiered data store are described. Using the techniques described herein, data may be migrated in bulk from a source data store to a destination data store that has multiple tiers of storage. The availability of the source data store for clients may be maintained throughout the migration. In one embodiment, the destination data store may include a primary or "warm" tier such as a database system and a secondary or "cold" tier such as an object-based data store. The primary tier may typically be more expensive for a unit of data and have lower latency for data access than the secondary tier. The bulk migration may include several steps or phases. In a first phase, live updates may begin to be migrated or replicated from the source to the primary tier of the destination while the source is online and interacting with clients. In a second phase, a replica of the source may be brought online. The replica may include a standby, and a snapshot may be taken of the standby. In a third phase, custom transform logic may be applied to source data in the standby or snapshot to generate transformed data (e.g., data having a different structure than in the source) that is suitable for storage in the secondary tier of the destination. In a fourth phase, the transformed data may be imported to the secondary tier. In a fifth phase, one or more clients may be provided access to the combination of the primary and secondary tiers to complete the migration. The destination data store may be accessible to clients through a single, unified interface for accessing or querying the multiple tiers of storage, such that the identity of the tier used to respond to a particular query may be hidden from the client who issued the query. In this manner, large amounts of data may be migrated efficiently without impacting the availability of the source.

Figure 1:
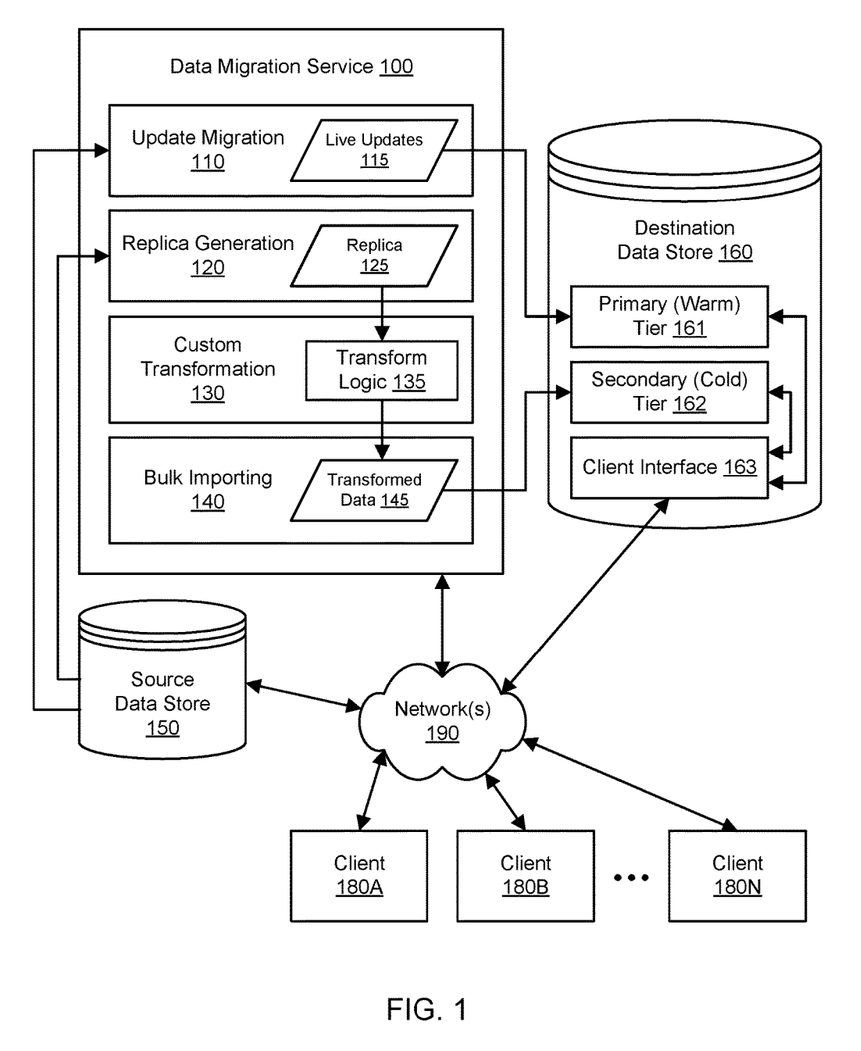
FIG. 1 illustrates an example system environment for migration to a multi-tiered data store, according to one embodiment.

FIG. 1 illustrates an example system environment for migration to a multi-tiered data store, according to one embodiment. The example system environment may include a data migration service 100 that enables efficient migration of large quantities of data from a source data store 150 to a destination data store 160. The migration may be performed in a manner that permits the source data store 150 to remain online and interact with its clients until the migration is complete. In one embodiment, any impact on the availability and performance of the source data store 150 may be minimized by the data migration service 100. The source data store 150 may include a database system such as a relational database management system (RDBMS), including commercially available systems. The source data store 150 may be maintained in the same premises, network, or organization as the destination data store 160 or in a different premises, network, or organization as the destination data store 160.

The destination data store 160 may include multiple tiers, such as a primary tier 161 and a secondary tier 162. The various tiers of the destination data store 160 may be implemented using different storage subsystems or services that may provide different storage characteristics. In one embodiment, for example, the primary tier 161 may be implemented using a database system such as Amazon DynamoDB, while the secondary tier 162 may be implemented using an object-based storage system such as Amazon Simple Storage Service (S3). Typically, the primary tier may offer data access with lower latency than the secondary tier. Due to the differing cost and performance characteristics of the tiers, the primary tier 161 may be used to store more frequently accessed data and may be referred to as a "warm" tier, while the secondary tier 162 may be used to store less frequently accessed data (typically in larger quantities) and may be referred to as a "cold" tier. The destination data store 160 and its constituent tiers may offer multi-tenancy to clients, e.g., clients of a provider network. Accordingly, the destination data store 160 may also be referred to as a multi-tenant data store. The destination data store 160 and its constituent tiers may offer dynamic sizing to clients such that the available capacity for a particular client's storage needs may be increased dynamically, e.g., using storage resources from a provider network. The destination data store 160 may include any suitable number and configuration of storage tiers implemented using any suitable storage subsystems and/or storage services. In one embodiment, the type, number, and/or configuration of the different storage tiers may be configured by a client of the destination data store 160. Additionally, policies for using the various tiers (e.g., policies for deciding which tier to use for storing a particular data element) may be configured by a client of the destination data store 160.

The various tiers of the destination data store 160 may store data elements on behalf of a plurality of clients (also referred to herein as tenants). The data elements may be structured differently in different tiers. For example, in the primary tier 161, the data elements may include key-value pairs, and the key-value pairs may be organized into data structures referred to as scopes. The data elements (e.g., key-value pairs) and/or data structures that contain them (e.g., scopes or tables) may be specific to particular clients, such that a particular data element or data structure may be said to belong to a particular client or to be owned by a particular client. The client that owns particular data elements may have access to read, write, or modify those data elements, in some cases exclusive of other clients. As another example, in the secondary tier 162, the data elements may be structured as objects and stored in secure, durable, highly scalable object storage in storage locations referred to as "buckets." An S3 object may include data, a key, and metadata; the object key (or key name) uniquely identifies the key-addressable object in a bucket, and an index of such keys may also be maintained. The secondary tier 162 may represent block-based storage (e.g., of 64 kilobyte blocks). Clients may use devices represented by client devices 180A-180N to perform or request suitable operations for reading, writing, or modifying data elements in the destination data store 160. The destination data store 160 may expose a client interface 163 to enable clients to participate in such operations. In one embodiment, the client interface 163 may represent a single, unified interface to all the tiers (e.g., the primary tier 161 and secondary tier 162). The client interface 163 may include any suitable user and/or programmatic interfaces, such as application programming interfaces (API) enabling operations such as "put" and "get."

The tiers of the destination data store 160 may be provided using one or more storage-related services, such as a relational database service, a non-relational or NoSQL database service, an object storage service that allows clients to store arbitrary amounts of data in the form of objects that can be accessed using web-services interfaces, a storage service that provides block-device level interfaces, and so on. A client of such a storage-related service may programmatically request the establishment of portion of the data store 160, such as an instance of a (relational or non-relational) database that can be used for numerous database tables or scopes and associated metadata such as indexes and the like. In the case of an object storage service, at least a portion of the data store 160 may include a collection of objects. In the case of a storage service providing block-device interfaces, the corresponding tier of the data store 160 may be implemented using one or more volumes. Generally speaking, the term "data store," as used herein, may refer to a collection of one or more data elements and/or data objects and associated metadata set up on behalf of one or more clients. After a data store has been created, a client may start populating various data elements within the data store, e.g., using requests for operations such as "create object," "update object," "insert object," "delete object," or other similar requests at various granularity levels depending in the data store type. For example, in the case of a database, operations such as creates, updates, and deletes may be supported at the table level, the record level, and for various metadata objects such as indexes, views, and the like. Clients may also issue read requests of various kinds, such as queries in the case of database objects.

The data migration service 100 may include any suitable functionalities or components to implement the techniques described herein. In one embodiment, the data migration service 100 may include a functionality for update migration 110, a functionality for replica generation 120, a functionality for custom transformation 130, and a functionality for bulk importing 140. The functionalities 110, 120, 130, and 140 may implement several steps or phases of the bulk migration of data from the source 150 to the destination 160. Using the update migration functionality 110, live data updates 115 occurring to data elements in the source 150 may begin to be migrated or replicated to the primary tier 161 of the destination 160. The update migration 110 may be initiated and performed while the source 150 is online and interacting with clients. The live data updates may represent incremental changes in one or more portions of the source data store (e.g., portions that are sought to be migrated). The incremental changes may include changes to the data elements (e.g., key-value pairs) provided by the clients, such as additions of data elements, deletions of data elements, modifications to data elements (e.g., modifications to values in key-value pairs), additions of scopes or tables, deletions of scopes or tables, modifications to scopes or tables, and/or other suitable changes. In one embodiment, both the source data store 150 and the primary tier 161 of the destination data store 160 may represent database systems, and the live updates may be migrated or replicated with minimal or no reformatting or restructuring of the data.

In one embodiment, the migration of live updates may be performed using coordination locks or lease locks per unit of data to ensure data integrity. If the source data represents item descriptions in an electronic catalog, then the unit of data may correspond to an item identifier. If all the data for such a unit (e.g., the entire set of descriptive data for an item in a catalog) is migrated to the destination using the update migration functionality 110, then the key for that unit may be flipped such that further updates may be made only to the destination data store 160 and not to the source data store 150.

Using the replica generation functionality 120, a replica 125 of the source may be brought online. The replica may include a standby, e.g., of a database system or some portion of its data (e.g., a table, scope, or partition). The standby may be left online for any suitable period of time, during which updates to the source data store 150 may be copied to the standby. Using the custom transformation functionality 130, custom transform logic 135 may be applied to source data in the standby to generate transformed data 145 (e.g., data having a different structure than in the source) that is suitable for storage in the secondary tier of the destination. As will be discussed below with respect to FIG. 2, the custom transform logic 135 may be applied instead to a snapshot of the standby or of other replica and not directly to the standby or to the other replica. In one embodiment, if the source data is taken directly from the standby, then the standby may be taken offline after generating the transformed data 145. If the source data is taken directly from the standby, then the standby may be loaded into another database system (e.g., a similar system as the one used for the source data store 150) in order to extract the source data more efficiently.

The transform logic 135 may be customized per data set and may be supplied by a client of the data migration service 100. In one embodiment, the transform logic may generate output data structured in one or more objects, e.g., data having a different structure than the source data and more suitable for storage in the secondary tier 162. The transform logic 135 may also generate one or more forward indices or other suitable metadata usable for storing the transformed data 145 in the secondary tier 162. In some embodiments, the application of the transform logic is optional. Using the bulk importing functionality 140, the transformed data 145 may be imported to the secondary tier 162 of the destination 160. In one embodiment, the bulk import to the secondary tier 162 may be canceled or modified if any of the data has been modified in the interim. For example, if one or more data elements have been deleted in any live updates, then those data elements may not be imported to the secondary tier 162. To complete the migration, one or more clients (e.g., clients 180A, 180B, and/or 180N) may be provided access to the combination of the primary and secondary tiers to complete the migration. The destination data store 160 may be accessible to clients through a single, unified interface 163 for accessing or querying the multiple tiers of storage, such that the identity of the tier used to respond to a particular query may be hidden from the client who issued the query.

In this manner, large amounts of data may be migrated efficiently without impacting the availability of the source 150. The data may also be migrated in a largely automatic manner, other than the initiation of the migration process and/or the supplying of the custom transform logic by one or more developer(s) and/or administrator(s). After the migration has been performed, the source data store 150 or the portion thereof that was migrated may be shut down or rendered inaccessible to new traffic, and all traffic (e.g., queries, updates, and so on) may be directed to the destination data store 160. Various policies may be implemented in the destination data store 160 to allow both tiers to be used for the same data set. For example, if a query seeks to retrieve a particular data element, the destination data store 160 may be configured to first query the primary tier 161 and then query the secondary tier 162 only if the primary tier does not store that data element. A client may configure policies for the destination data store 160 to store data in either tier based on anticipated latency requirements, tier size, and other suitable criteria. Caching within the destination data store 160 may also be configured based on client requirements, e.g., to implement a cache internal to the secondary tier 162 to improve the latency of that tier.

Any of the clients 180A-180N may represent a customer (e.g., an individual or group) of the source data store 150, destination data store 160, and/or data migration service 100. The data migration service 100, source data store 150, destination data store 160, and clients 180A-180N may be coupled to one another through one or more networks 190. The data migration service 100, source data store 150, destination data store 160, and clients 180A-180N may be implemented using computing devices such as the example computing device 3000 illustrated in FIG. 6. For example, one or more computing devices that execute the data migration service 100 may be implemented using the example computing device 3000 illustrated in FIG. 6. Similarly, any of the client computing devices 180A-180N may be implemented using the example computing device 3000 illustrated in FIG. 6. In various embodiments, portions of the described functionality of the data migration service 100 may be provided by the same computing device or by any suitable number of different computing devices. If any of the components of the data migration service 100 are implemented using different computing devices, then the components and their respective computing devices may be communicatively coupled, e.g., via a network. Each of the illustrated components (such as the data migration service 100 and its constituent functionalities) may represent any combination of software and hardware usable to perform their respective functions. Operations implemented by the data migration service 100 may be performed automatically, e.g., without a need for user initiation or user intervention after an initial configuration stage, and programmatically, e.g., by execution of program instructions on a computing device.

It is contemplated that the example system environment of FIG. 1 may include additional components not shown, fewer components than shown, or different combinations, configurations, or quantities of the components shown. For example, although storage tiers 161 and 162 are shown for purposes of example and illustration, it is contemplated that different quantities and configurations of storage tiers may be used. Additionally, although three client computing devices 180A, 180B, and 180N are shown for purposes of example and illustration, it is contemplated that different quantities and configurations of client computing devices may be used. Aspects of the functionality described herein may be performed, at least in part, by components outside of the example system environment.

Figure 2:
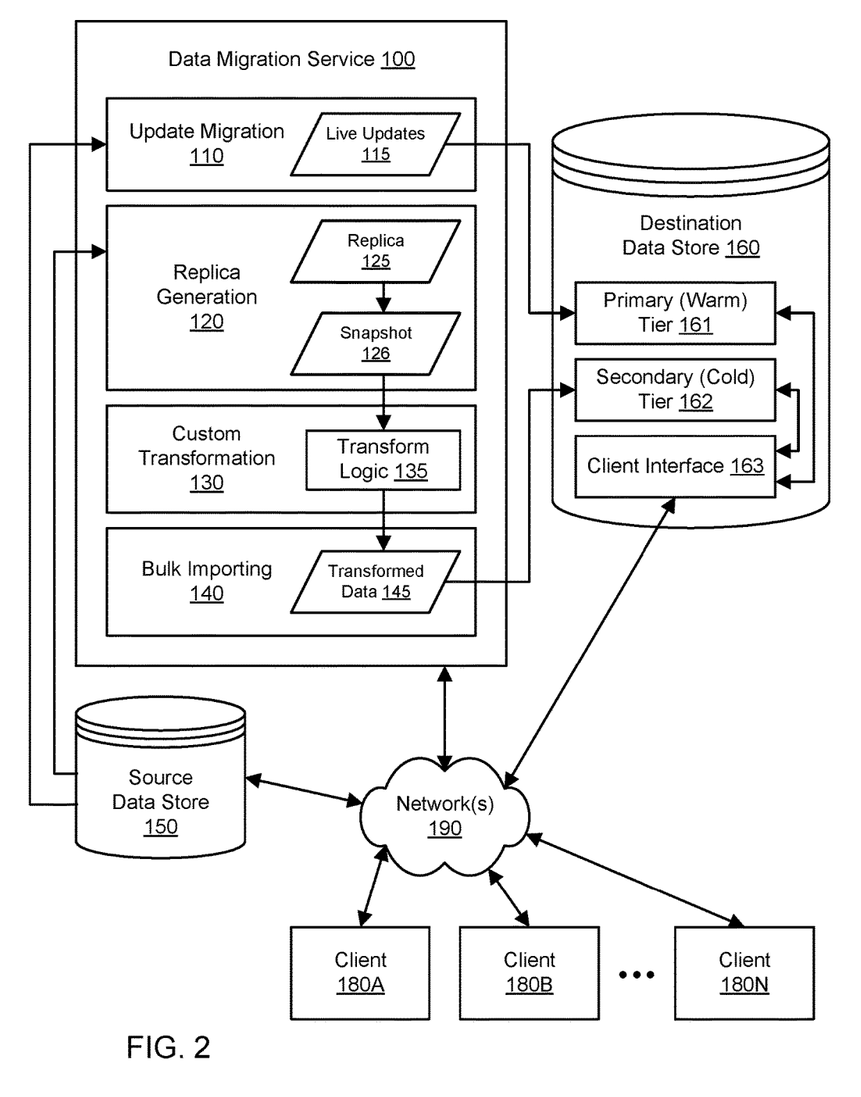
FIG. 2 illustrates further aspects of the example system environment for migration to a multi-tiered data store, including the use of a snapshot of a standby for bulk importing, according to one embodiment.

FIG. 2 illustrates further aspects of the example system environment for migration to a multi-tiered data store, including the use of a snapshot of a standby for bulk importing, according to one embodiment. As discussed above, using the replica generation functionality 120, a replica 125 of the source may be brought online. The replica may include a standby, e.g., of a database system or some portion of its data (e.g., a table, scope, or partition). The standby may be left online for any suitable period of time, during which updates to the source data store 150 may be copied to the standby. In one embodiment, a snapshot 126 may be taken of the standby, and the standby may then be taken offline to minimize the performance impact on the source data store 150. Using the custom transformation functionality 130, the custom transform logic 135 may be applied to source data in snapshot to generate the transformed data 145 (e.g., data having a different structure than in the source) that is suitable for storage in the secondary tier of the destination.

Figure 3:
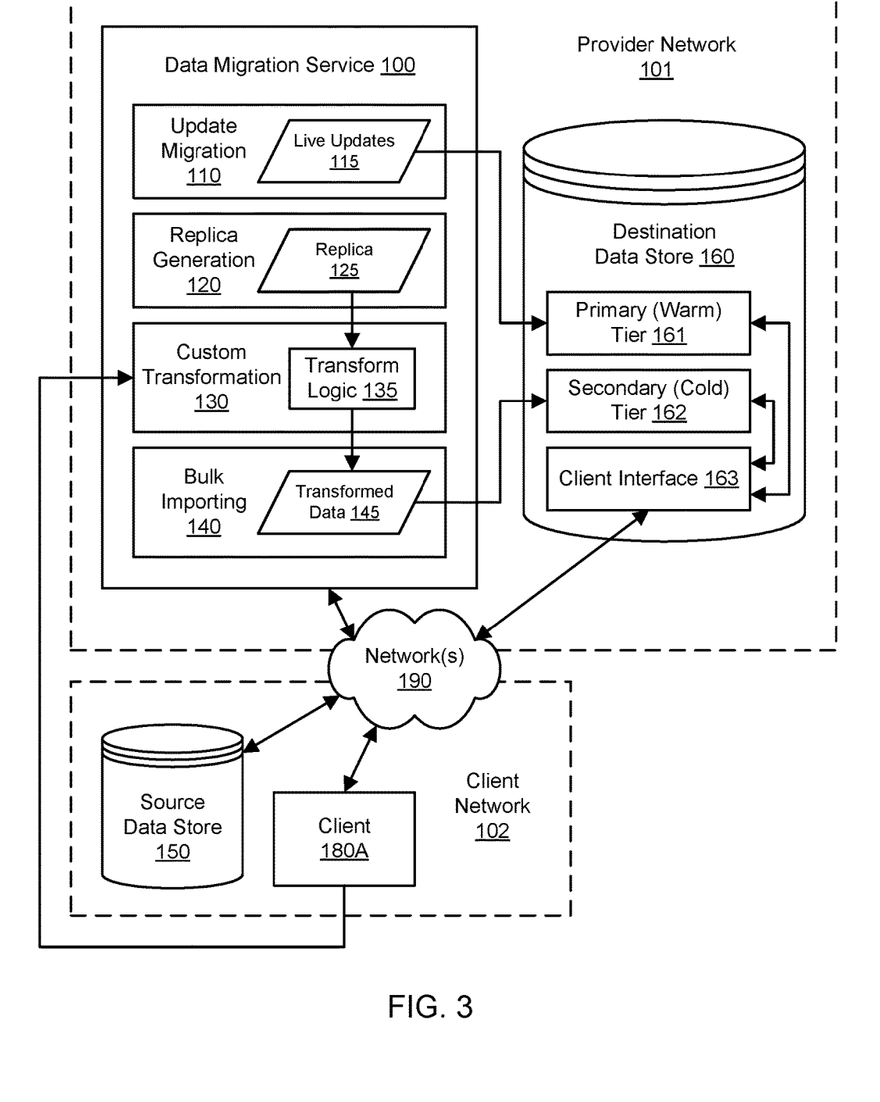
FIG. 3 illustrates further aspects of the example system environment for migration to a multi-tiered data store, including providing the data migration service and multi-tiered data store to a client of a provider network, according to one embodiment.

FIG. 3 illustrates further aspects of the example system environment for migration to a multi-tiered data store, including providing the data migration service and multi-tiered data store to a client of a provider network, according to one embodiment. A provider network 101 may offer access to resources and services, such as the data migration service 100 and destination data store 160 (and its constituent storage services and/or subsystems), using multi-tenancy. In one embodiment, one or more clients (e.g., as represented by client device 180A) and/or source data store 150 may be part of a client network 102 that is external to the provider network 101. The client network 102 and provider network 101 may be coupled through the one or more networks 190. The provider network may offer the client 180A access to the data migration service 100 and destination data store 160 based on a fee arrangement or other billing arrangement. Any suitable user interfaces and/or programmatic interfaces for the data migration service 100 may be exposed to the client 180A, including one or more APIs or web-based user interfaces. Using the techniques described herein, data may be migrated on behalf of a client 180A from outside the provider network 101 (e.g., from a source data store 150 on client-managed premises or otherwise accessible to the client) to resources of the provider network. Using the techniques described herein, data may also be migrated from a source data store 150 within the provider network 101 to resources of the provider network. The transform logic 135 may be supplied by the client 180A of the data migration service 100 using any suitable user interface(s) and/or programmatic interface(s).

Provider network 101 may include a network set up by an entity (such as a company or a public sector organization) to provide one or more services (such as various types of multi-tenant and/or single-tenant cloud-based computing or storage services) accessible via the Internet and/or other networks to a distributed set of clients 180A-180N. Provider network 101 may include numerous data centers hosting various resource pools, such as collections of physical and/or virtualized computer servers, storage devices, networking equipment and the like (e.g., implemented using computing system 3000 described below with regard to FIG. 6), needed to implement, configure and distribute the infrastructure and services offered by the provider. Within large provider networks, some data centers may be located in different cities, states, or countries than others, and in some embodiments the resources allocated to a given application or service may be distributed among several such locations to achieve desired levels of availability, fault-resilience, and performance.

In some embodiments, provider network 101 may provide computing resources; storage services, such as a block-based storage service, key-value based data stores or various types of database systems; and/or any other type of network-based services, including the data migration service 100. Client devices 180A-180N may access these various services offered by provider network 101 via network(s) 190. Likewise, network-based services may themselves communicate and/or make use of one another to provide different services. For example, computing resources offered to clients 180A-180N in units called "instances," such as virtual or physical compute instances or storage instances, may make use of particular data volumes, providing virtual block storage for the compute instances. The provider network 101 may implement or provide a multi-tenant environment such that multiple clients (e.g., using computing devices 180A-180N) may access or use a particular resource in a substantially simultaneous manner. The provider network 101 may include a plurality of computing devices, any of which may be implemented by the example computing device 3000 illustrated in FIG. 6. The provider network 101 may include a fleet of computing devices, also referred to herein as servers, hosts, or instances, which are configured to execute software on behalf of clients of the provider network. In one embodiment, a fleet of servers may grow or shrink as individual servers are provisioned or deprovisioned using resources of the provider network 101. In one embodiment, the fleet of servers may grow or shrink as individual servers are added to or removed from a dedicated fleet by an administrator.

The client computing devices 180A-180N may represent or correspond to various clients or users of the provider network 101, such as customers who seek to use services offered by the provider network. The clients, users, or customers may represent persons, businesses, other organizations, and/or other entities. The client computing devices 180A-180N may encompass any type of client configurable to submit requests to provider network 101. For example, a given computing device may include a suitable version of a web browser, or it may include a plug-in module or other type of code module configured to execute as an extension to or within an execution environment provided by a web browser. In one embodiment, a computing device may encompass an application such as a database application (or user interface thereof), a media application, an office application, or any other application that may make use of virtual compute instances, storage volumes, or other network-based services in provider network 101 to perform various operations. In some embodiments, such an application may include sufficient protocol support (e.g., for a suitable version of Hypertext Transfer Protocol [HTTP]) for generating and processing network-based service requests without necessarily implementing full browser support for all types of network-based data. In some embodiments, client computing devices 180A-180N may be configured to generate network-based service requests according to a Representational State Transfer (REST)-style network-based services architecture, a document- or message-based network-based services architecture, or another suitable network-based services architecture. In some embodiments, client computing devices 180A-180N (e.g., a computational client) may be configured to provide access to a virtual compute instance in a manner that is transparent to applications implement on the computing device utilizing computational resources provided by the virtual compute instance. In at least some embodiments, client computing devices 180A-180N may provision, mount, and configure storage volumes implemented at storage services for file systems implemented at the computing devices.

Client computing devices 180A-180N may convey network-based service requests to provider network 101 via network(s) 190. In various embodiments, network(s) 190 may encompass any suitable combination of networking hardware and protocols necessary to establish network-based communications between client computing devices 180A-180N and provider network 101. For example, the network(s) 190 may generally encompass the various telecommunications networks and service providers that collectively implement the Internet. The network(s) 190 may also include private networks such as local area networks (LANs) or wide area networks (WANs) as well as public or private wireless networks. For example, both a given computing device 180A and the provider network 101 may be respectively provisioned within enterprises having their own internal networks. In such an embodiment, the network(s) 190 may include the hardware (e.g., modems, routers, switches, load balancers, proxy servers, etc.) and software (e.g., protocol stacks, accounting software, firewall/security software, etc.) necessary to establish a networking link between the given computing device 180A and the Internet as well as between the Internet and the provider network 101. It is noted that in some embodiments, client computing devices 180A-180N may communicate with provider network 101 using a private network rather than the public Internet.

Figure 4:
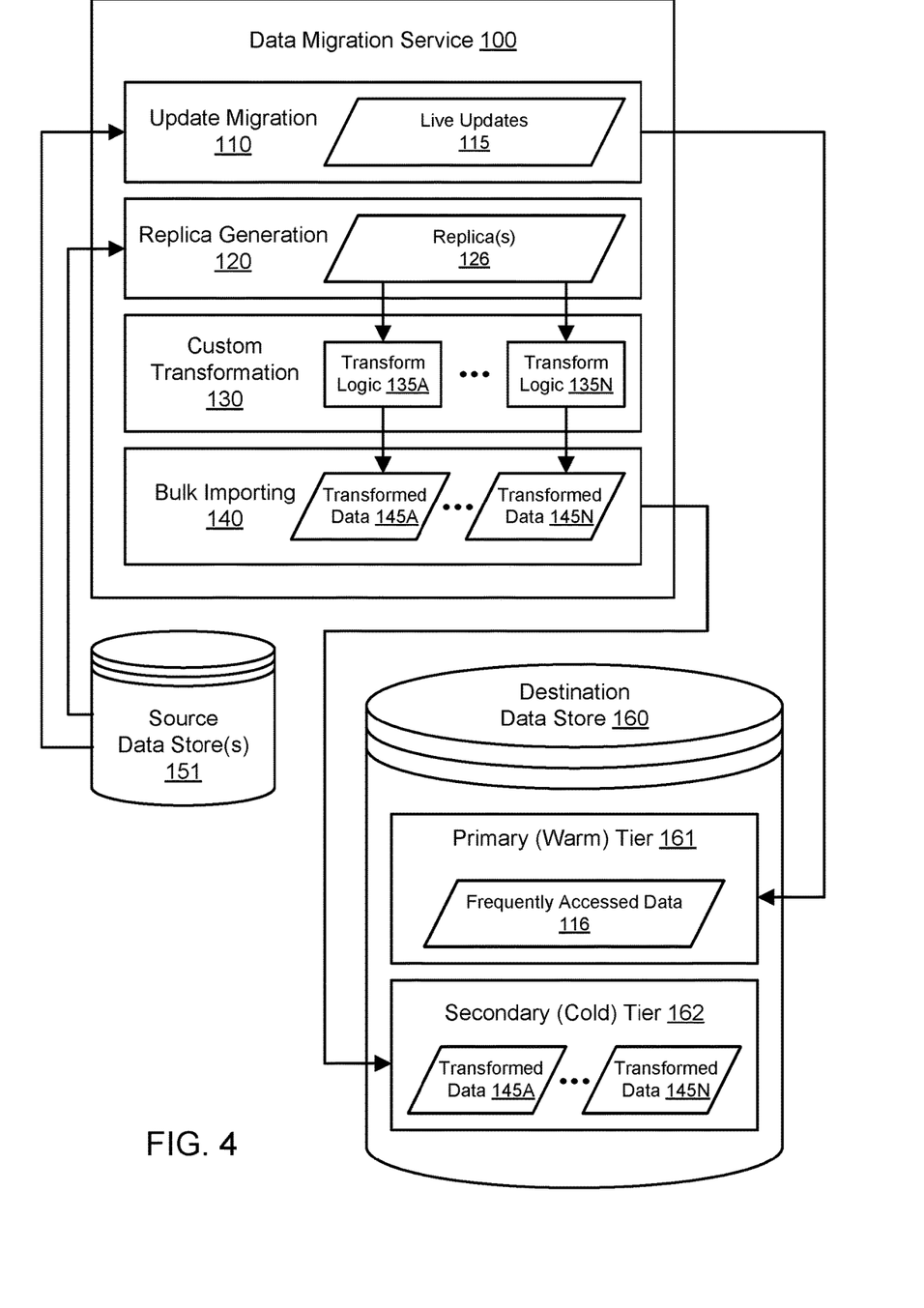
FIG. 4 illustrates further aspects of the example system environment for migration to a multi-tiered data store, including the customization of transform logic for different data sets, according to one embodiment.

FIG. 4 illustrates further aspects of the example system environment for migration to a multi-tiered data store, including the customization of transform logic for different data sets, according to one embodiment. In one embodiment, the data migration service 100 may migrate from one or more source data stores 151 on behalf of one or more clients. The one or more source data stores 151 may include a plurality of tables, scopes, partitions, or other database elements that are sought to be migrated to the multi-tiered destination data store 160. The plurality of data elements may be owned or managed by one or more clients of the data migration service 100. In one embodiment, the replica generation functionality 120 may generate one or more replicas 126, e.g., such that one replica may be generated for each of the one or more source data stores 151.

As discussed above, using the custom transformation functionality 130, custom transform logic may be applied to source data in the replica(s) 126 to generate transformed data (e.g., data having a different structure than in the source) that is suitable for storage in the secondary tier of the destination. The transform logic 135 may be customized per data set and may be supplied by the one or more clients of the data migration service 100. As shown in the example of FIG. 4, different sets of transform logic 135A through 135N may vary for different data sets in the replica(s) 126 (and originally in the source data store(s) 151). The transform logic 135A-135N may include any suitable program code (including high-level code and/or compiled binaries), scripts, or other instructions. The transform logic 135A-135N may be executed or otherwise implemented using any suitable service, such as a service of a provider network 101 that executes client-supplied program code using computational resources of the provider network. By applying the different sets of transform logic 135A-135N to different portions of the replica(s), the custom transformation functionality 130 may generate different sets of transformed data 145A through 145N corresponding to the different sets of source data and the different sets of transform logic. In some embodiments, the different sets of transformed data 145A-145N may vary in their structure or contents based on differences in the transform logic 135A-135N.

In one embodiment, the transform logic may generate output data 145A-145N structured in one or more objects, e.g., data having a different structure than the source data and more suitable for storage in the secondary tier 162. The transform logic 135 may also generate one or more forward indices or other suitable metadata usable for storing the transformed data 145A-145N in the secondary tier 162. Using the bulk importing functionality 140, the transformed data 145A-145N may be imported to the secondary tier 162 of the destination 160. As also shown in FIG. 4, the primary tier 161 may store data elements representing frequently accessed data 116 from the source data store(s) 151. The data in both of the tiers may be key-accessible, but the organizational scheme for the data may vary between the tiers.

In some embodiments, various policies may be configured to determine how and/or where to store particular data elements in the destination data store 160. These policies may be referred to as tiering policies. Tiering policies may be determined based on client input, default policies, or a combination thereof. In general, tiering policies may be directed to keeping more frequently accessed data and/or more recently accessed data in the "warm" tier 161 while keeping less frequently accessed or older data in the "cold" tier 162. In one embodiment, a tiering policy may seek to estimate which data elements are expected to be accessed in a particular window of time (e.g., a particular part of the year) and then distribute data elements between the tiers accordingly. For example, if the data in the data store 160 represents descriptions of items in a catalog, then a tiering policy may be determined based (at least in part) on the relative popularity of items at certain times of the year. In such an environment, Halloween costumes may be treated differently in the weeks preceding Halloween than during the rest of the year due to their increased popularity during that time.

Therefore, in various embodiments, tiering policies may distribute data elements among various tiers of a multi-tier data store based on any suitable criteria, including the last updated time of a data element, the frequency of read access for a data element, the frequency of write access for a data element, and the anticipated frequency of read and/or write access for a data element during a particular window of time (e.g., the seasonality of data elements). Machine learning techniques may be used to determine the seasonality of items (e.g., based on the frequency of access for items on different dates) and then generate or modify tiering policies accordingly. Tiering policies may be applied to move data elements from the warm tier 161 to the cold tier 162 or from the cold tier 162 to the warm tier 161 at particular times. A particular element of data may be moved back and forth between the two tiers many times depending upon its seasonality, page views, and other suitable criteria.

In one embodiment, the source data store(s) 151 may include one or more databases associated with an electronic catalog system. The electronic catalog system may host an electronic catalog listing a variety of items. The electronic catalog may also provide functionality for users to acquire catalog items from various catalog item providers. For example, the electronic catalog system may be part of an electronic commerce ("e-commerce") site that hosts an electronic catalog of many millions of items offered for sale or otherwise made available by numerous retailers, sellers, vendors, merchants, etc. (collectively and interchangeably referred to herein as "merchants"). In a typical example of an e-commerce site, the items available through the electronic catalog may be associated with various elements of item data. The item data may include attributes such as price, availability, title, item identifier, item feedback (e.g., user reviews, ratings, etc.), item image, item description, and various other item attributes. Typically, the item data associated with an item may range from a few kilobytes to a few megabytes in size. The item data may be updated at various points in time, and the updates may come from various sources of item data (manufactures, sellers, retailers, other components of the electronic catalog system, etc.).

Figure 5:
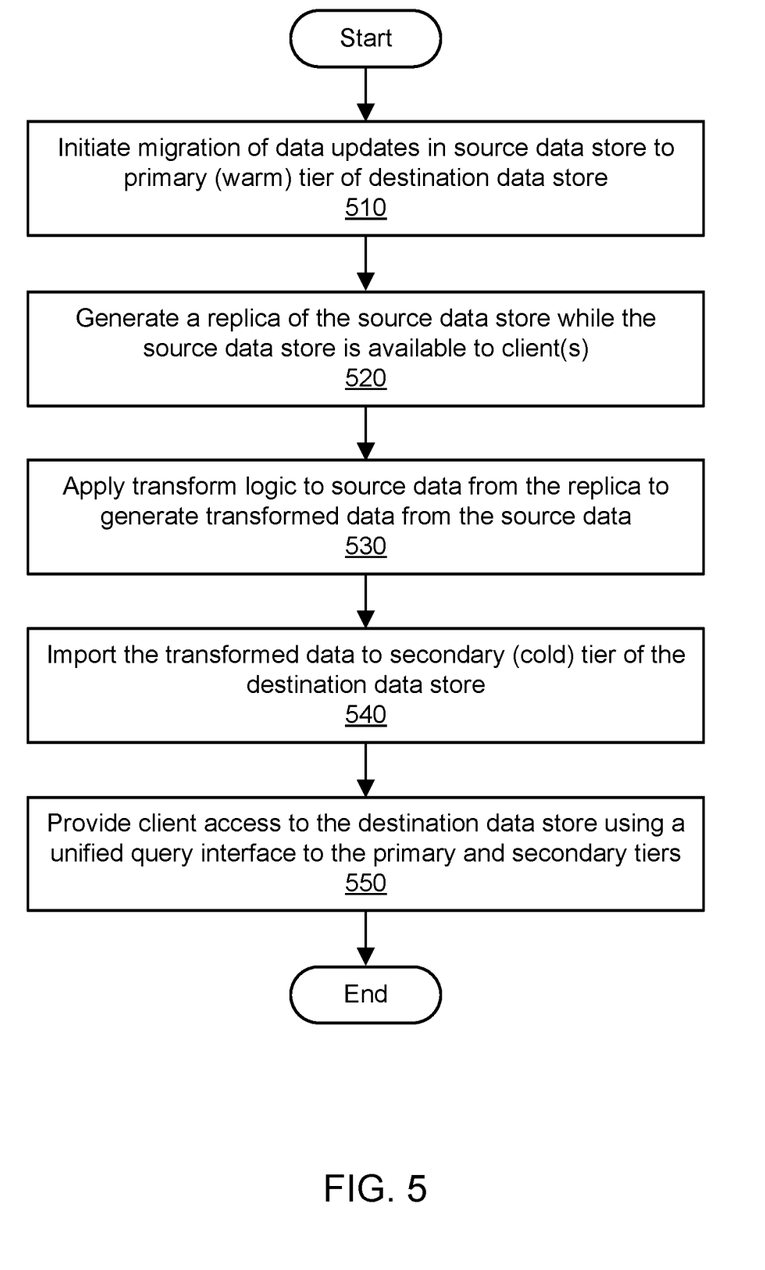
FIG. 5 is a flowchart illustrating a method for migration to a multi-tiered data store, according to one embodiment.

FIG. 5 is a flowchart illustrating a method for migration to a multi-tiered data store, according to one embodiment. The operations shown in FIG. 15 may be performed by a data migration service 100, potentially in conjunction with other services or components. The data migration service may perform efficient bulk migration of data from a source data store (e.g., a database) to a multi-tiered destination data store with at least a primary (warm) storage tier and a secondary (cold) storage tier. For example, the primary tier may include or be implemented using a database system, and the secondary tier may include or be implemented using an object-based data store having higher latency for access than the database system.

As shown in 510, migration of live updates in a source data store may be initiated. The live updates may be replicated to a primary tier of a destination data store. Live data updates occurring to data elements in the source may begin to be migrated or replicated to the primary tier of the destination and may continue until the migration to both tiers is complete. The update migration may be initiated and performed while the source is online and interacting with clients. The live data updates may represent incremental changes in one or more portions of the source data store (e.g., portions that are sought to be migrated). The incremental changes may include changes to the data elements (e.g., key-value pairs) provided by the clients, such as additions of data elements, deletions of data elements, modifications to data elements (e.g., modifications to values in key-value pairs), additions of scopes or tables, deletions of scopes or tables, modifications to scopes or tables, and/or other suitable changes. In one embodiment, both the source data store and the primary tier of the destination data store may represent database systems, and the live updates may be migrated or replicated with minimal or no reformatting or restructuring of the data.

As shown in 520, a replica of the source data store may be generated. The replica may be generated while the source data store is online. The replica may represent a standby of the source data store, e.g., if the source is a database system. The standby may be left online for any suitable period of time, during which updates to the source data store 150 may be copied to the standby. In one embodiment, a snapshot of the standby may be generated, and the standby may be taken offline after the snapshot is generated.

As shown in 530, transform logic may be applied to source data from the replica of the source data store. The transform logic may generate transformed data from (e.g., based on) the source data, such as data having a different structure. In one embodiment, the transform logic may be applied to source data in a standby; the standby may be taken offline (such that updates in the source are not replicated to the standby) prior to applying the transform logic. If the source data is taken directly from the standby, then the standby may be loaded into another database system (e.g., a similar system as the one used for the source data store) in order to extract the source data more efficiently. In one embodiment, the transform logic may instead be applied to source data in a snapshot of a standby. The transform logic may be customized for a particular data set in the source data store. The transform logic may be received from a client of the data migration service. The destination data store may be implemented using resources of a multi-tenant provider network, and the source data store and the client may be external to the multi-tenant provider network.

As shown in 540, the transformed data may be imported to a secondary tier of the destination data store. As shown in 550, client access to the destination data store may be provided. The client access may be provided using a common query interface to the primary tier and the secondary tier. For example, using the unified interface, data responsive to a particular query may be retrieved from the primary tier or the secondary tier, and a response to the particular query may not indicate whether the data was retrieved from the primary tier or the secondary tier. Availability of the source data store to one or more clients may be maintained until the transformed data is imported to the secondary tier of the destination data store or until the client is provided access to both tiers in the destination. In this manner, large amounts of data may be migrated efficiently without impacting the availability of the source data store.

Illustrative Computer System

Figure 6:
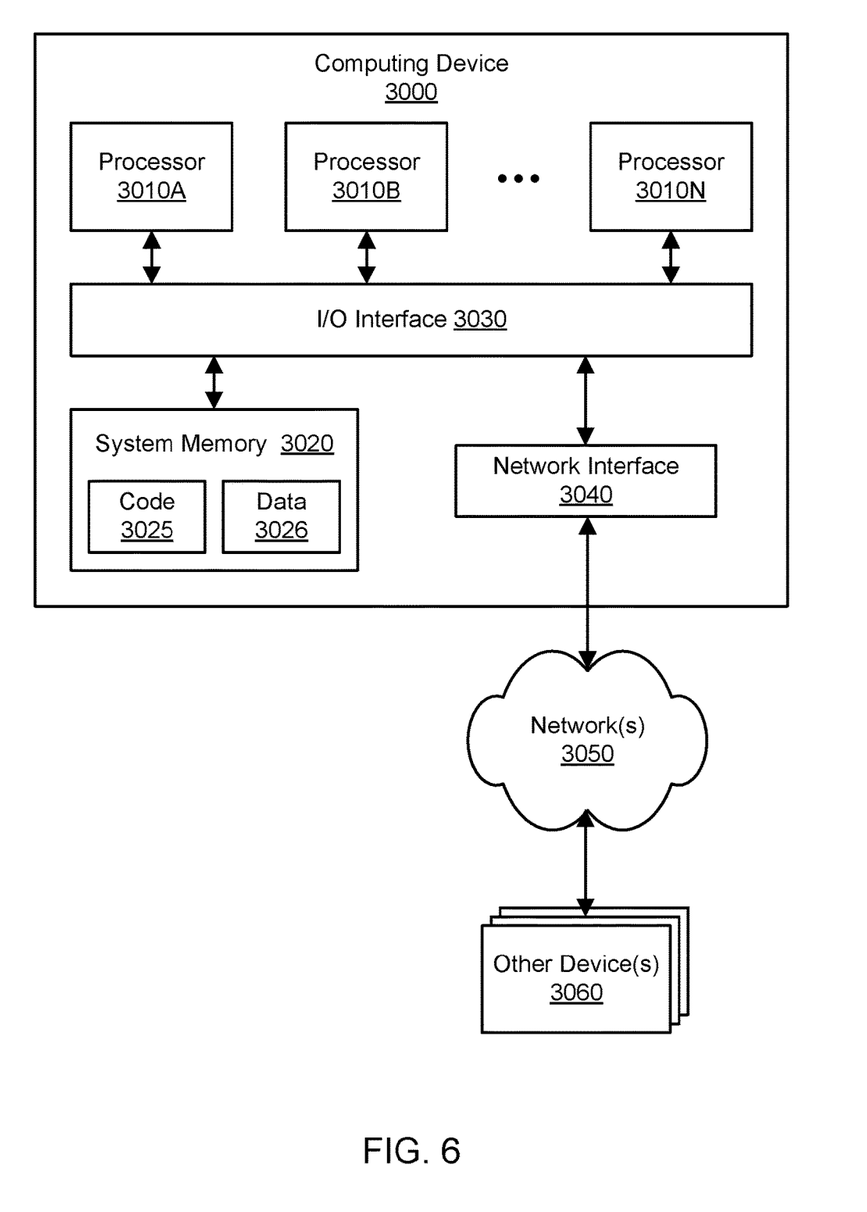
FIG. 6 illustrates an example computing device that may be used in some embodiments.

In at least some embodiments, a computer system that implements a portion or all of one or more of the technologies described herein may include a computer system that includes or is configured to access one or more computer-readable media. FIG. 6 illustrates such a computing device 3000. In the illustrated embodiment, computing device 3000 includes one or more processors 3010A-3010N coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). Processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In multiprocessor systems, each of processors 3010A-3010N may commonly, but not necessarily, implement the same ISA.

System memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processors 3010A-3010N.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 6 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   a destination data store comprising a warm tier and a cold tier, wherein the warm tier has a lower latency for data access than the cold tier;
   one or more computing devices configured to implement a data migration service, wherein the data migration service is configured to:
      initiate migration of live updates in a source data store to the warm tier of the destination data store;
      generate a replica of the source data store while the source data store is online;
      apply transform logic to source data from the replica of the source data store, wherein the transform logic generates transformed data from the source data, and wherein the transformed data has a different structure than the source data;
      import the transformed data to the cold tier of the destination data store; and
      provide, to one or more clients, access to the destination data store using a common query interface to the warm tier and the cold tier.

2. The system as recited in claim 1, wherein the data migration service is further configured to:
   generate a snapshot of the replica, wherein the transform logic is applied to the source data in the snapshot; and
   take the replica offline after generating the snapshot.

3. The system as recited in claim 1, wherein the data migration service is further configured to:
   take the replica offline before applying the transform logic to the source data.

4. The system as recited in claim 1, wherein the data migration service is further configured to:

receive the transform logic from a client of the data migration service, wherein the destination data store is implemented using resources of a multi-tenant provider network, and wherein the source data store and the client are external to the multi-tenant provider network.

5. A computer-implemented method, comprising:
performing, by one or more computing devices that collectively implement a data migration service:
  initiating migration of live updates in a source data store to a primary tier of a destination data store;
  generating a replica of the source data store while the source data store is available to interact with one or more clients, wherein the replica comprises source data;
  applying transform logic to the source data from the replica of the source data store, wherein the transform logic generates transformed data from the source data; and
  importing the transformed data to a secondary tier of the destination data store.

6. The method as recited in claim 5, wherein the method further comprises:
generating a snapshot of the replica, wherein the transform logic is applied to the source data in the snapshot; and
taking the replica offline after generating the snapshot.

7. The method as recited in claim 5, wherein the method further comprises:
taking the replica offline before applying the transform logic to the source data.

8. The method as recited in claim 5, further comprising:
receiving the transform logic from a client of the data migration service, wherein the destination data store is implemented using resources of a multi-tenant provider network, and wherein the source data store and the client are external to the multi-tenant provider network.

9. The method as recited in claim 5, wherein the transform logic is customized for a particular data set in the source data store, and wherein the transformed data has a different structure than the source data for the particular data set.

10. The method as recited in claim 5, further comprising:
providing, to one or more clients, access to the destination data store using a common query interface to the primary tier and the secondary tier, wherein data responsive to a particular query is retrieved from the primary tier or the secondary tier, and wherein a response to the particular query does not indicate whether the data was retrieved from the primary tier or the secondary tier.

11. The method as recited in claim 5, wherein the primary tier comprises a database system, and wherein the secondary tier comprises a data store having higher latency for access than the database system, and wherein data in the primary tier and in the secondary tier is key-accessible.

12. The method as recited in claim 5, wherein availability of the source data store to the one or more clients is maintained until the transformed data is imported to the secondary tier of the destination data store.

13. The method as recited in claim 5, further comprising:
initiating migration of live updates in a different source data store to the primary tier of the destination data store;
generating a replica of the different source data store while the different source data store is available to interact with one or more clients, wherein the replica comprises different source data;
applying different transform logic to the different source data from the replica of the different source data store, wherein the different transform logic is distinct from the transform logic and the different transform logic generates transformed different data from the different source data; and
importing the transformed different data to the secondary tier of the destination data store.

14. A computer-readable storage medium storing program instructions computer-executable to perform:
initiating migration of live updates in a source data store to a warm tier of a destination data store;
generating a replica of the source data store while the source data store is online;
applying a custom transformation to source data from the replica of the source data store, wherein the custom transformation generates transformed data from the source data; and
importing the transformed data to a cold tier of the destination data store.

15. The computer-readable storage medium as recited in claim 14, wherein the program instructions are further computer-executable to perform:
generating a snapshot of the replica, wherein the custom transformation is applied to the source data in the replica; and
taking the replica offline after generating the snapshot.

16. The computer-readable storage medium as recited in claim 14, wherein the program instructions are further computer-executable to perform:
taking the replica offline before applying the custom transformation to the source data.

17. The computer-readable storage medium as recited in claim 14, wherein the program instructions are further computer-executable to perform:
receiving the custom transformation from a client of the data migration service, wherein the destination data store is implemented using resources of a multi-tenant provider network, and wherein the source data store and the client are external to the multi-tenant provider network.

18. The computer-readable storage medium as recited in claim 14, wherein the custom transformation is specific to a particular data set in the source data store, and wherein the transformed data has a different structure than the source data for the particular data set.

19. The computer-readable storage medium as recited in claim 14, wherein the program instructions are further computer-executable to perform:
providing, to one or more clients, access to the destination data store using a common query interface to the warm tier and the cold tier, wherein data responsive to a particular query is retrieved from the warm tier or the cold tier, and wherein a response to the particular query does not indicate whether the data was retrieved from the warm tier or the cold tier.

20. The computer-readable storage medium as recited in claim 14, wherein availability of the source data store to one or more clients is maintained until the transformed data is imported to the cold tier of the destination data store.

* * * * *